US006589628B1

(12) United States Patent
Wilkinson et al.

(10) Patent No.: US 6,589,628 B1
(45) Date of Patent: Jul. 8, 2003

(54) ARTICLE HAVING OPTICAL EFFECTS

(75) Inventors: Albert Wilkinson, Nashua, NH (US); Steven M. Perreault, Haverhill, MA (US)

(73) Assignee: Omnova Solutions Inc., Fairlawn, OH (US)

(*) Notice: Subject to any disclaimer, the term of this patent is extended or adjusted under 35 U.S.C. 154(b) by 159 days.

(21) Appl. No.: 09/604,134

(22) Filed: Jun. 27, 2000

(51) Int. Cl.[7] .................................................. B32B 3/30

(52) U.S. Cl. ........................ 428/141; 428/195; 428/212; 345/583; 345/582; 283/91; 382/100

(58) Field of Search ................................. 428/141, 195, 428/212; 345/583, 582; 382/100; 283/91

(56) References Cited

U.S. PATENT DOCUMENTS 3,506,779 A * 4/1970 Brown et al. ............... 101/150
4,761,253 A 8/1988 Antes
5,808,758 A 9/1998 Solmsdorf
5,885,490 A 3/1999 Kawaguchi et al.
5,915,731 A * 6/1999 Jackson ....................... 283/109

* cited by examiner

*Primary Examiner*—William P. Watkins, III
(74) *Attorney, Agent, or Firm*—Calfee Halter & Griswold; Robert F. Rywalski; David G. Burleson

(57) ABSTRACT

A method and system for forming an article having an optical effect is provided. An original texture is obtained which is digitized using a scanner. The scanner causes a shadow effect on the texture based on the scanning direction. The digitized texture is then edited to define a selected shape. The texture within the selected shape is offset such that its direction is changed. The digitized texture is then engraved by a laser onto the surface of an article. The selected shape is then visually distinct from the other areas of the texture at certain viewing angles caused by the difference in their texture direction. With the present invention, lines or seams between areas of the texture are eliminated.

15 Claims, 3 Drawing Sheets

ARTICLE HAVING OPTICAL EFFECTS

FIELD OF THE INVENTION

The present invention relates to the optical effect art. It finds particular application to an article having variable optical effects based on its viewing angle and a method and system for making such article. It will be appreciated that the present invention can be applied to a variety of articles such as wall paper, signs, logos, designs, vinyl covers or any other article that may contain an optical effect.

BACKGROUND OF THE INVENTION

One type of optical effect can be produced on an article by having a relief pattern formed on its surface. The relief may be in the form of a geometrical figure, a number, a letter, an ornament, a guilloche, etc., and may be formed for example by stringing together a large number of relatively small optical-diffraction elements. Such relief patterns may be achieved by virtue of the fact that diffraction structures can be produced by interferometric superimposition of coherent light beams with different angles of incidence, which are converted by photolithographic means into the surface microprofile. Fixed prefabricated optical masks can be used for geometrically defining the areas to be exposed to light. If the relief pattern to be produced and its microscopic structure exceed a given degree of graphic and structural complexity, the mask procedure is found to be prohibitively expensive. In addition, optical-diffraction structural elements with an asymmetrical profile, for example sawtooth configurations, cannot be produced by the above-mentioned interferometric method.

Another type of optical effect can be produced using structures exhibiting an optical diffraction effect such as phase diffraction gratings, phase holograms and the like. The structures can be formed on an article by stamping or embossing a thermoplastic substrate by means of an embossing die, using pressure and heat. The synthesis of a surface pattern having an optical diffraction effect could also be effected by numerous phase diffraction elements being strung together by repeated embossing in a thermoplastic substrate. This method, however, achieves unsatisfactory results because troublesome beads are produced at the edges of the embossing region between the heated pressure region and the unheated non-pressure area outside the embossing region. Beads are also produced between different image objects and adjacent areas on the surface. In addition, the various embossing regions cannot be fitted together without a joint or seam therebetween, as the high thermal mass of metal embossing dies means that, at the edge of a new embossing region, the edge region of the adjacent old embossing region is necessarily erased.

In other prior embossing techniques, an original stipple pattern is created from grit or gravel and pieced into a PVC sleeve. This is then electroplated into a copper sleeve and mounted on a cylinder. A vinyl sheet is then embossed with the stipple pattern by pressing the cylinder over the sheet. In order to obtain a long embossed sheet, two or more cylinders are needed. However, each cylinder is made independent of the others and, thus, will have a different pattern due to different electroplating conditions and other variables involved in making the cylinder. Furthermore, a seam is typically visible between regions.

The present invention provides a new and unique method and system for forming an article having an optical effect which cures the above problems and others.

SUMMARY OF THE INVENTION

In accordance with the present invention, a method of forming an article having an optical effect is provided. A digital image of a texture is provided. The texture in a selected portion of the digital image is then modified to be different that other areas of the texture. The digital image is then reproduced into an article where the selected portion has an optical effect different than other portions of the article.

In accordance with a more limited aspect of the present invention, modifying includes angularly offsetting a direction of the texture in the selected portion.

In accordance with another aspect of the present invention, an article having an optical effect is provided. The article includes an engraved surface which has a textured grain. A shape is defined in the engraved surface where the textured grain within the shape is different that the textured grain on other portions of the engraved surface. The shape is visually distinguishable in the engraved surface at selected viewing angles.

In accordance with a more limited aspect of the present invention, the textured grain within the shape is in an opposite direction than the textured grain outside the shape. When the article is viewed from a first angle, the textured grain within the shape appears shadowed while the textured grain outside the shape appears light, thus, the shape is visually distinguishable.

In accordance with another aspect of the present invention, a system for forming a latent image on a material is provided. A scanner digitizes a stipple pattern to obtain a digital stipple pattern. An image processor defines an area in the digital stipple pattern by offsetting the stipple pattern within the area. A laser engraves the digital stipple pattern on a material where the area exhibits a different optical effect than other portions of the material.

One advantage of the present invention is that optical effects can be produced on an article without having beads or seams between different regions of an engraved texture. Furthermore, a latent image is produced on a article without using reflective materials or other light diffusing elements.

Another advantage of the present invention is that an optical effect is produced in a texture by changing the shadow effect within a selected region of the texture. A laser then precisely engraves the texture thus eliminating mechanical embossing techniques.

Yet another advantage of the present invention is that articles such as wallpaper or signs can be engraved with instructional messages or directions which are visible at certain viewing angles and invisible at other angles. In this manner, the decorative aspect of a wallpaper is not sacrificed.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PREFERRED EMBODIMENTS

Figure 1:
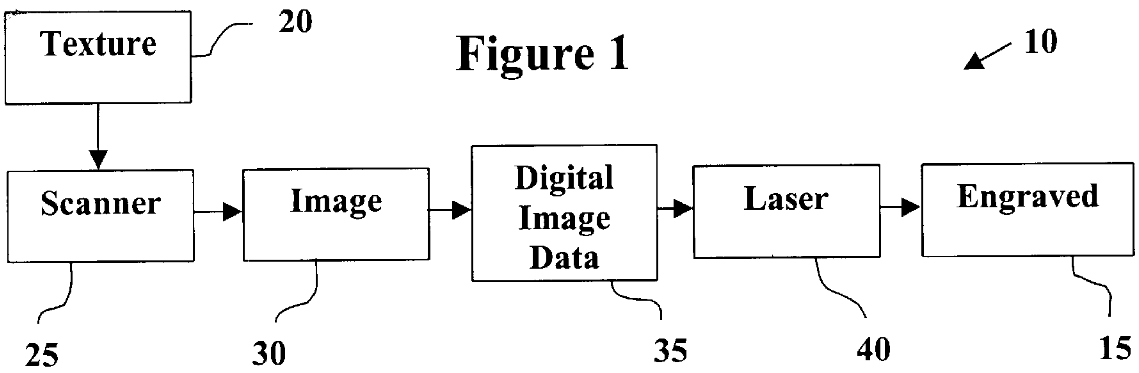
FIG. 1 is diagram of a system in accordance with the present invention.

With reference to FIG. 1, a system 10 for forming an article 15 having a textured optical effect is shown in accordance with the present invention. A texture 20 is selected that will be the basis of the texture on the article 15. The texture can be formed from scratch or obtained from an outside source. For example, a stipple is used as the texture and is in a sheet or skin-like form. Other examples include a textured vinyl sheet generated from an embossing roll. It will be appreciated that any stipple sample can be used that has a grain pattern or other surface texture with peaks and valleys.

With further reference to FIG. 1, a scanner 25 or other digitizing device is used to digitize the texture 20 into a digital image. Since the texture 20 has peaks and valleys, the scanner 25 creates a shadow on one side of the peaks based on the scanning direction. This is caused by the scanning light. For example, if scanning is from left to right, a shadow is formed on the right side of the peaks. The shadow becomes part of the digital image causing the texture to have a leaning effect and a direction. This will be further described with reference to FIG. 3 below.

An image processor 30 is then used to manipulate and edit the digital image to define selected shapes and objects in the texture that will exhibit an optical effect. This is further described with reference to FIG. 2 below. Any known image/graphics processor can be used such as any sophisticated software program like Adobe Photoshop, Fractal and the like. Once the texture image is manipulated, it is stored as a digital image data file 35 that is engraved by a laser 40 onto the article 15. Laser controlling systems are well known in the art and will not be described herein. Briefly, the laser 40 is controlled to engrave the article 15 by using the digital image data file 35 as instructions for forming the texture on the article 15.

Figure 2:
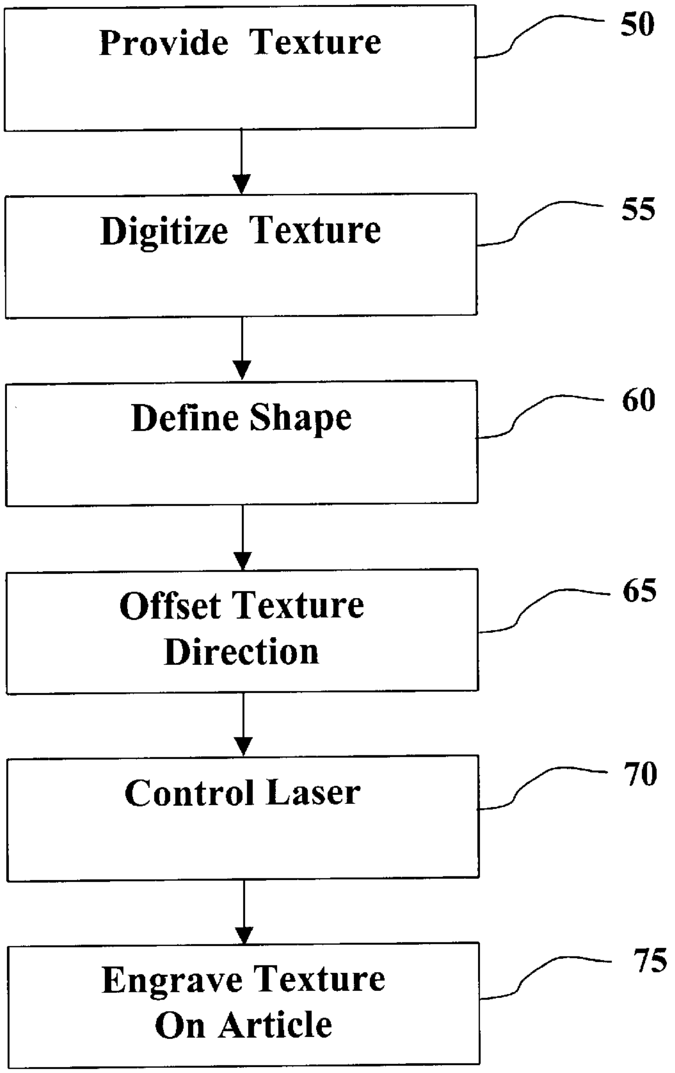
FIG. 2 is a process diagram for forming an article in accordance with the present invention.

With reference to FIG. 2, the process of forming the article 15 and its optical effect is shown. As mentioned above, a texture is first provided 50 and digitized 55 into a digital image of the texture. With the processor 30, one or more areas in the digital image are selected or a mask is created that defines an object shape 60 such as a letter, a phrase, a graphical image, geometric shapes, or any desired shape. The texture within the selected area is then modified by angularly offsetting 65 the texture such that it has a different direction than the non-selected areas. This includes, for example, shifting, rotating or inverting the texture in the selected area. Preferably, the selected texture area is inverted or flipped horizontally such that its shadow effect is opposite the shadow effect of the non-selected areas. Finally, the digital image is used to control a laser to engrave 75 the digital image into a material forming the engraved article 15. The engraved article may be in many different forms such as on unsupported vinyl film or on fabric backed vinyl. Of course, any laser engraveable material can be used. The article may be in a single piece, sheets or rolls.

Alternately, the optical effect within the selected area can be achieved in other ways by modifying the properties of the texture within a defined shape instead of or in combination with offsetting its direction. For example, the digital texture within the selected area can be reduced or enlarged. Also, the grey scale levels within the selected area can be increased or decreased which causes the laser to engrave the texture deeper or shallower on the article. Thus, the selected area is produced with a different texture depth than surrounding areas on the article. The texture within the selected area can also be substituted with a different texture grain.

Figure 3:
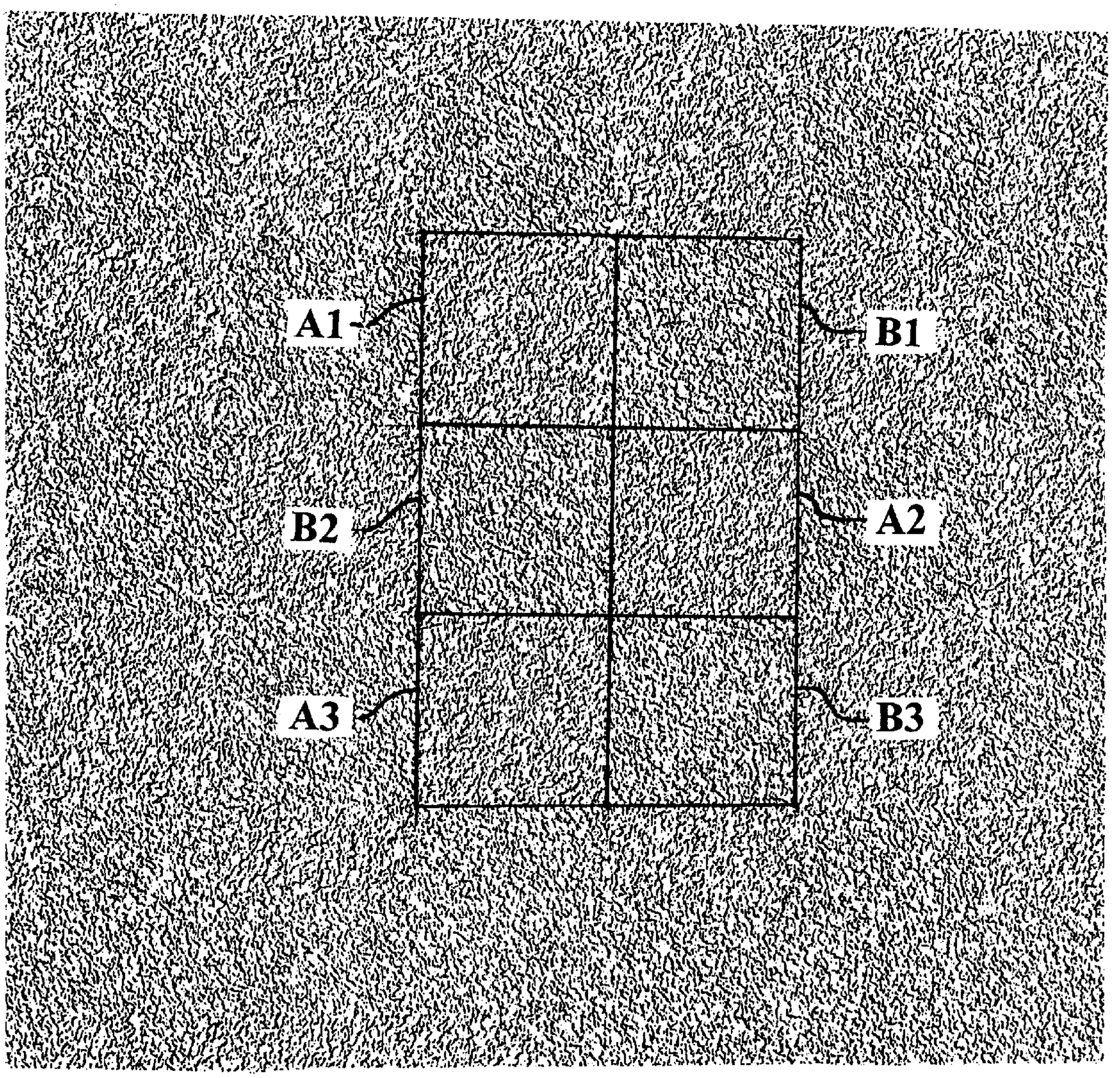
FIG. 3 is an image of an exemplary digitized texture having defined checkered board squares in accordance with the present invention.

With reference to FIG. 3, an exemplary reproduction of a digitized texture is shown. Of course, the actual texture is a three dimensional surface with peaks and valleys. The white areas in FIG. 3 represent peaks and the dark areas represent shadows that were formed by the scanning process. It will be noted that the lines defining squares A1, A2, A3, B1, B2 and B3 are not part of the digital image but are used to more clearly describe the texture formed by the present invention. In that regard, it can be seen, although not easily, that the texture in squares A1, A2 and A3 share the same grain direction and shadow effect direction. The texture in squares B1, B2 and B3 share the same grain direction and shadow effect direction but it is different that the direction in squares A1, A2 and A3. The texture of squares A1, A2 and A3 represents the original texture created after scanning, while the texture in squares B1, B2 and B3 represents areas that were selected and inverted. In this example, the object created in the texture is a checkered board pattern. It will be appreciated that the defined objects are virtually undetectable when viewed directly. In fact, other squares exist outside the outline squares in FIG. 3. Beads or seams between areas are eliminated with the preset process.

Once the digitized texture is completed with defined shapes, checkered board in this case, the texture is engraved by the laser 40 as a microfine pattern into the article 15 with depths of about 0.015" to 0.018". Of course, other depths can be used. As stated above, the checkered board pattern is virtually undetectable when the viewing angle is perpendicular to the article 15 because there are no seams between the squares. However, when viewed from a first side angle, the checkered board pattern becomes visible due to its lighting and shadow effects caused by the opposite texture directions in the squares. Squares A1, A2 and A3 having their texture in a first direction will appear light while the other squares B1, B2 and B3 having their texture in an opposite direction will appear shadowed or darker. Reversing the viewing angle also reverses the lighting effect on the squares such that the previous light squares A1, A2 and A3 now become shadowed and the previous shadowed squares B1, B2 and B3 become light.

Figure 4:
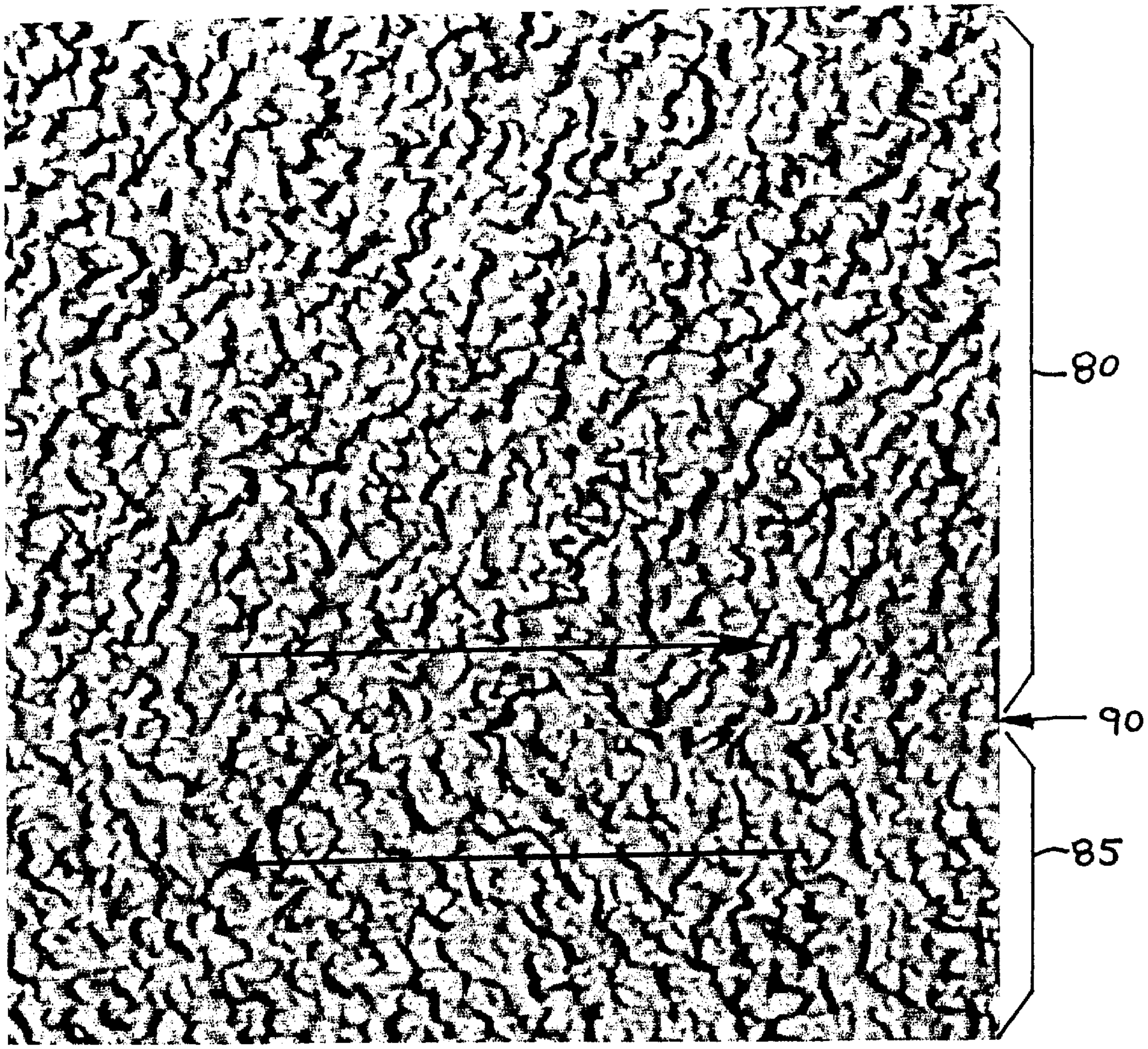
FIG. 4 is a magnified image of the digitized texture of FIG. 3 showing two grain directions.

With reference to FIG. 4, the digitized texture of FIG. 3 is magnified. The arrows indicate a direction of the grain. In other words, area 80 has its grain leaning toward the right and area 85 has its grain leaning toward the left. At joint 90, the grain direction changes from area 80 to area 85. By reversing the grain direction while in digital form, the texture can be reproduced by a laser without seams or beads appearing in the texture. As explained above, by changing the direction or lean of the grain, a different lighting effect is produced. Thus in the present example, area 80 produces a light/shadow effect that is different than a light/shadow effect produced by area 85. The different effect, therefore, allows each region to be visually distinct from each other at certain viewing angles depending on the grain direction. However, at angles substantially perpendicular to the texture, the texture will virtually appear uniformed with no apparent distinct regions because no shadow is seen at these angles. In this manner, reflective materials or elements that diffuse light are not required to produce a latent image.

With the present invention, articles such as wallpaper, signage, logos, etc. can be formed with latent images which become visible at certain viewing angles and are invisible at other angles. For example, the word "exit" and directional arrows can be defined on a wallcovering in accordance with the present invention that does not destroy the decorative aspects of the wallcovering. The word "exit" would be unnoticeable at certain viewing angles and noticeable at others. Other article uses include translucent sleeves and covers for book binders, folders and the like.

The invention has been described with reference to the preferred embodiment. Obviously, modifications and alterations will occur to others upon a reading and understanding of this specification. It is intended to include all such modifications and alterations insofar as they come within the scope of the appended claims or the equivalence thereof.

We claim:

1. An article having an optical effect, comprising:

an opaque substrate;

a reflective, three-dimensional outer surface on said opaque substrate for providing said optical effect;

said outer surface including first and second outer surface portions located in adjacent first and second areas, respectively, of said article;

each one of said first and second outer surface portions including a plurality of projecting surface features defining peaks and valleys on said outer surface portion, said projecting surface features having individual surfaces thereon that are light reflective;

said projecting surface features of said first outer surface portion being oriented and arranged on said first outer surface portion so that when said first area of said article is viewed from a first direction generally perpendicular to said first outer surface portion ambient light reflects from said individual surfaces on said projecting surface features in said first area in a manner such that said first area has a first appearance;

when said article is viewed from a second direction oblique to said outer surface, said first area has a second, relatively light, appearance; and when said article is viewed from a third direction oblique to said outer surface and opposite said second direction, said first area has a third, relatively dark, appearance;

said second outer surface portion in said second area being a modified copy of said first outer surface portion in said first area with an imaginary line between said first and second areas;

said projecting surface features in said second area being oriented and arranged on said second outer surface portion so that when said second area of said article is viewed from said first direction ambient light reflects from said individual surfaces on said projecting surface features in said second area in a manner such that said second area has said first appearance;

when said article is viewed from said second direction said second area has said third, relatively dark, appearance;

when said article is viewed from said third direction said second area has said second, relatively light, appearance;

whereby said first and second areas have the same appearance as each other when said article is viewed from said first direction and have opposite appearances from each other when said article is viewed from either said second direction or said third direction.

2. An article as set forth in claim 1 wherein said projecting surface features define peaks having sloped sides to produce a leaning effect.

3. An article as set forth in claim 1 wherein said first outer surface portion has a stippled texture that includes said plurality of projecting surface features defining peaks and valleys on said first outer surface portion.

4. An article as set forth in claim 1 wherein said copy of said first outer surface portion in said first area is flipped about said imaginary line between said first and second areas.

5. An article as set forth in claim 1 wherein said copy of said first outer surface portion in said first area is rotated about said imaginary line between said first and second areas.

6. An article as set forth in claim 1 wherein said copy of said first outer surface portion in said first area is reduced or enlarged in said second area compared to said first outer surface portion in said first area.

7. An article as set forth in claim 1 wherein said copy of said first outer surface portion in said first area has gray scale levels increased or decreased in said second area compared to said first outer surface portion in said first area.

8. An article as set forth in claim 1 wherein said article is wallpaper.

9. An article as set forth in claim 1 wherein said three-dimensional outer surface is formed by a laser.

10. An article as set forth in claim 9 wherein said laser is controlled to reproduce a digital image on said substrate.

11. An article as set forth in claim 1 wherein said projecting surface features of said first and second outer surface portions have a depth of from about 0.015 inches to about 0.018 inches.

12. An article as set forth in claim 1 wherein said imaginary line between said first and second areas is a straight line.

13. An article as set forth in claim 2 wherein said projecting surface features define peaks having sloped sides to produce a leaning effect that creates a first shadow effect within said first area and creates a second shadow effect different than said first shadow effect within said second area.

14. An article as set forth in claim 3 wherein said stippled texture in said first outer surface portion defines a textured grain that is of a different texture from the surface outside said first and second outer surface portions.

15. An article as set forth in claim 3 wherein said stippled texture in said first outer surface portion defines a textured grain that is of a different size from the texture in the surface outside said first and second outer surface portions.

* * * * *